US006887399B2

(12) United States Patent
Slack et al.

(10) Patent No.: US 6,887,399 B2
(45) Date of Patent: May 3, 2005

(54) POLYMERIC ALLOPHANATES OF DIPHENYLMETHANE DIISOCYANATE, PREPOLYMERS OF THESE POLYMERIC ALLOPHANATES, AND PROCESSES FOR THE PREPARATION OF THE POLYMERIC ALLOPHANATES AND THE PREPOLYMERS THEREOF

(75) Inventors: William E. Slack, Moundsville, WV (US); Hersel T. Kemp, II, New Martinsville, WV (US); William E. Miller, Clairsville, OH (US)

(73) Assignee: Bayer MaterialScience LLP, Pittsburgh, PA (US)

( * ) Notice: Subject to any disclaimer, the term of this patent is extended or adjusted under 35 U.S.C. 154(b) by 136 days.

(21) Appl. No.: 10/238,444

(22) Filed: Sep. 9, 2002

(65) Prior Publication Data

US 2004/0049001 A1 Mar. 11, 2004

(51) Int. Cl.$^7$ ............... C07C 275/60; C07C 269/02; C07C 271/66; C07C 273/00; C07C 275/62
(52) U.S. Cl. ............... 252/182.2; 252/182.21; 252/182.22; 560/25; 560/26; 560/335; 560/336; 560/359; 564/38; 564/44
(58) Field of Search ............... 252/182.2, 182.21, 252/182.22; 560/25, 26, 335, 336, 359; 564/38, 44

(56) References Cited

U.S. PATENT DOCUMENTS

| | | | | |
|---|---|---|---|---|
| 4,695,645 A | * | 9/1987 | Merger et al. | 560/24 |
| 4,740,610 A | * | 4/1988 | Merger et al. | 560/24 |
| 4,810,820 A | * | 3/1989 | Slack et al. | 560/27 |
| 5,319,053 A | | 6/1994 | Slack et al. | 528/48 |
| 5,319,054 A | | 6/1994 | Slack et al. | 528/48 |
| 5,440,003 A | | 8/1995 | Slack | 528/48 |
| 5,461,135 A | * | 10/1995 | Malofsky et al. | 528/60 |
| 5,541,281 A | * | 7/1996 | Yeske et al. | 528/70 |
| 5,567,793 A | | 10/1996 | Slack et al. | 528/69 |
| 5,610,260 A | | 3/1997 | Schmalstieg et al. | 528/49 |
| 5,663,272 A | | 9/1997 | Slack et al. | 528/69 |
| 5,686,042 A | | 11/1997 | Slack et al. | 264/328.6 |
| 5,789,519 A | * | 8/1998 | Slack et al. | 528/49 |
| 5,821,275 A | | 10/1998 | Madan et al. | 521/159 |
| 5,874,485 A | | 2/1999 | Milliren et al. | 521/160 |
| 6,271,279 B1 | | 8/2001 | Nodelman et al. | 521/159 |
| 6,639,040 B1 | * | 10/2003 | Slack et al. | 528/49 |

FOREIGN PATENT DOCUMENTS

EP  0 719 809 A1  7/1996

* cited by examiner

*Primary Examiner*—Rabon Sergent
(74) *Attorney, Agent, or Firm*—Joseph C. Gil; N. Denise Brown

(57) ABSTRACT

The present invention relates to a new high functionality MDI. In particular, this invention relates to polymeric allophanates based on diphenylmethane diisocyanate having an NCO group content of 12 to 30%, prepolymers thereof, and processes for the production of these compositions. The prepolymers are stable liquids having NCO group contents of about 10 to about 28%.

22 Claims, No Drawings

POLYMERIC ALLOPHANATES OF DIPHENYLMETHANE DIISOCYANATE, PREPOLYMERS OF THESE POLYMERIC ALLOPHANATES, AND PROCESSES FOR THE PREPARATION OF THE POLYMERIC ALLOPHANATES AND THE PREPOLYMERS THEREOF

BACKGROUND OF THE INVENTION

The present invention relates to a new high functionality MDI. More specifically, this invention relates to an alcohol or diol based allophanate-modified MDI, which is further converted to a higher functionality allophanate product. These higher functionality allophanate products are referred to as polymeric allophanates herein. The present invention also relates to prepolymers of these polymeric allophanates, to a process of making and using the polymeric allophanates, and to a process of making and using the prepolymers of the polymeric allophanates.

Copending application Ser. No. 10/0017,060, filed Dec. 13, 2001, which is commonly assigned, discloses a method of reducing the acidity of polymeric MDI and then treating the p-MDI with an alcohol in the presence of an allophanate catalyst to produce a dark colored allophanate-modified polymeric MDI. However, this application does not disclose a polymeric allophanate with higher functionality.

Allophanate-modified diphenylmethane diisocyanates and prepolymers thereof are known and described in, for example, U.S. Pat. Nos. 5,319,053, 5,319,054, 5,440,003, 5,663,272 and 5,686,042.

U.S. Pat. No. 5,319,053 discloses a process for preparing stable liquid allophanate-modified MDI isocyanates and prepolymers of these allophanate-modified MDI isocyanates. This process comprises reacting a specific MDI isomer composition with an aliphatic alcohol containing between 1 and 36 carbon atoms to give an allophanate-modified MDI having an NCO group content of 12 to 32.5%.

U.S. Pat. No. 5,319,054 describes a process for producing diallophanate-modified MDI by reacting the diurethane which is the reaction product of one equivalent of a diisocyanate with one equivalent of an aliphatic alcohol or an aromatic alcohol, with 4,4'-MDI containing about 2 to about 60% by weight of the 2,4-isomer of MDI. These diallophanates have NCO group contents of about 12 to about 30%.

EP 641,812 discloses the use of allophanate-modified MDI prepolymers in automotive RIM and rigid foam applications. It is a distinct feature of the invention that the flex modulus of the RIM products can be increased without modifying the chain extender composition or content.

Stable, liquid, diallophanate-modified diphenylmethane diisocyanate is known and described in, for example, U.S. Pat. No. 5,686,042. These diallophanate-modified diisocyanates are prepared from the diurethane of an alcohol and a diisocyanate and MDI. The diallophanate or a prepolymer thereof are disclosed as being used in a RIM process to produce elastomers with improved flex modulus. Since these diallophanates form elastomers with improved flex modulus, lower levels of fast reacting chain extenders are required to reach a given stiffness.

Urethane-free, allophanate-modified diphenylmethane diisocyanates are known and disclosed in, for example, U.S. Pat. No. 5,567,793. This reference also discloses the use of urethane-free, allophanate-modified isocyanates in RIM processes to improve the flex modulus of the resultant elastomers.

U.S. Pat. No. 5,663,272 discloses allophanate-modified MDI prepolymers and their use in RIM processes to improve the flex modulus of the resultant elastomers. These allophanate modified MDI's are made from a monoisocyanate with an organic compound having at least two OH groups to form a urethane, and then converting the urethane to allophanate by reacting with an isomeric mixture of MDI.

Allophanate-modified MDI's, various prepolymers thereof and other modifications thereof, can in used in various end use applications such as, for example, footwear and flexible foams, as is known and described in, for example, U.S. Pat. Nos. 5,663,272, 5,821,275 5,874,485 and 6,271,279.

Advantages of the polymeric allophanates and prepolymers thereof of the present invention include the creation of a unique high functionality molecule that can vary over a broad functionality range. These polymeric allophanates and prepolymers thereof are light in color and low in acidity and have unique curing characteristics when used in polymers.

SUMMARY OF THE INVENTION

This invention relates to polymeric allophanates which are higher functionality allophanates based on diphenylmethane diisocyanate (MDI). In particular, the present invention relates to an alcohol or a diol based allophanate modified MDI which is further converted, partially or completely, to a higher functionality allophanate product (i.e., a polymeric allophanate). This invention also relates to prepolymers of these polymeric allophanates based on diphenylmethane diisocyanate (MDI), to a process for the preparation of the polymeric allophanates based on MDI and to a process for the preparation of the prepolymers of the polymeric allophanates based on MDI.

One embodiment of the present invention relates to polymeric allophanates based on MDI, which have an NCO group content of 12 to 30% by weight. These polymeric allophanate comprise (A) an allophanate-modified isocyanate based on MDI, having an NCO group content of 20 to 32% by weight and which comprises the reaction product of: (1) one or more OH-group containing compounds selected from the group consisting of (a) aliphatic alcohols, (b) aromatic alcohols, (c) aliphatic idols and (d) mixtures thereof, and (2) diphenylmethane diisocyanate comprising (a) from 0 to 60% by weight of 2,4'-diphenyl-methane diisocyanate, (b) less than 6% by weight of 2,2'-diphenylmethane diisocyanate, and (c) the balance being 4,4'-diphenylmethane diisocyanate, with the %'s by weight of (2)(a), (2)(b) and (2)(c) totaling 100% by weight of (2); in the presence of (3) one or more allophanate catalysts; wherein (A) said allophanate-modified isocyanate based on MDI is held at a temperature of from 20 to 70° C. (preferably 20 to 50° C., most preferably 30 to 40° C.) from about 1 hour to about 30 days (preferably about 1 day to about 30 days) to form (B) a polymeric allophanate of diphenylmethane diisocyanate having an NCO group content of 12 to 30% by weight.

Another embodiment of the present invention relates to prepolymers of the polymeric allophanates described above and which have an NCO group content of 10 to 28% by weight. These prepolymers comprise the reaction product of (B) the polymeric allophanate based on diphenylmethane diisocyanate having an NCO group content of 12 to 30% as described above, which are held at a temperature of from 20 to 70° C. (preferably 20 to 50° C., most preferably 30 to 40° C.) from about 1 hour to about 30 days (preferably about 1 day to about 30 days), followed by the addition of one or more catalyst stoppers, and (C) an OH-group containing compound which is selected from the group consisting of: (1) one or more polyether polyols containing from about 1.5 to about 6 hydroxyl groups and having a molecular weight of about 300 to about 6,000, (2) one or more low molecular weight diols having a molecular weight of about 76 to about 200, (3) one or more polyester polyols containing from about 1.5 to about 3 hydroxyl groups and having a molecular weight of about 300 to about 3,000, and (4) mixtures thereof.

The process for the preparation of the polymeric allophanate based on diphenylmethane diisocyanate having an NCO group content of 12 to 30% by weight comprises: (I) reacting (1) one or more OH-group containing compounds selected from the group consisting of (a) aliphatic alcohols, (b) aromatic alcohols, (c) aliphatic diols and (d) mixtures thereof; and (2) diphenylmethane diisocyanate comprising: (a) from 0 to 60% by weight of 2,4'-diphenylmethane diisocyanate, (b) less than 6% by weight of diphenylmethane diisocyanate, and (c) the balance being 4,4'-diphenylmethane diisocyanate, with the %'s by weight of (2)(a), (2)(b) and (2)(c) totaling 100% by weight of (2), in the presence of (3) one or more allophanate catalysts, at temperatures of about 80 to about 110° C. to form (A) an allophanate-modified isocyanate based on diphenylmethane diisocyanate; and (II) cooling (A) the allophanate-modified isocyanate based on diphenylmethane diisocyanate to a temperature of about 20 to about 70° C. (preferably 20 to 50° C., most preferably 30 to 40° C.) for about 1 hour to about 30 days (preferably about 1 day to about 30 days); and, optionally, (III) adding (4) a catalyst stopper after the cooling step, thereby forming (B) the polymeric allophanate based on diphenylmethane diisocyanate which has an NCO group content of 12 to 30%.

The present invention also relates to a process for the preparation of prepolymers of the polymeric allophanate based on diphenylmethane diisocyanate as described above, wherein the prepolymers have an NCO group content of about 10 to about 28% by weight. This process comprises (I) adding (4) at least one catalyst stopper to (B) the polymeric allophanate based on diphenylmethane diisocyanate having an NCO group content of 12 to 30% by weight as described above, (II) reacting the polymeric allophanate which contains catalyst stopper from (I), with (C) an OH-group containing compound selected from the group consisting of: (1) one or more polyether polyols containing about 1.5 to about 6 hydroxyl groups and having a molecular weight of about 300 to about 6,000, (2) one or more low molecular weight diols having a molecular weight of about 76 to about 200, (3) one or more polyester polyols containing about 1.5 to about 3 hydroxyl groups and having a molecular weight of about 300 to about 3,000 and (4) mixtures thereof.

DETAILED DESCRIPTION OF THE INVENTION

As used herein, the term polymeric allophanate refers to compositions corresponding to the general structure:

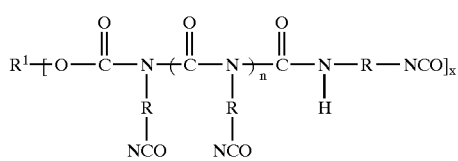

(I)

wherein:
n: represents an integer of from 1 to 100, preferably from 1 to 50 and most preferably from 1 to 20;

R: represents diphenylmethane;
and
x: represents an integer of 1 or 2;
with the proviso that:
when x=1,
$R^1$: represents a hydrocarbon radical containing from 1 to 36 carbon atoms, which is selected from the group consisting of alkyl radicals, alkenyl radicals, cycloalkyl radicals, arylalkyl radicals and aryl radicals, each of which may contain groups that are not reactive with isocyanate groups, such as, for example, ether groups and halogens;
and
when x=2,
$R^1$: represents a hydrocarbon radical containing from 2 to 16 carbon atoms, which is selected from the group consisting of alkyl radicals, alkenyl radicals, cycloalkyl radicals and arylalkyl radicals, each of which may contain groups that are not reactive with isocyanate groups, such as, for example, ether groups and halogens.

In the general polymeric allophanate composition (I) set forth above, wherein x=1, the polymeric allophanate is based on an alcohol, and corresponds to the general structure:

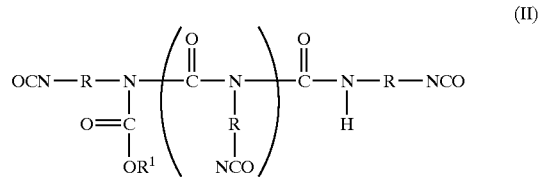

(II)

wherein: n, R and $R^1$ are as defined in structure (I) above.

In the general polymeric allophanate composition (I) set forth above, wherein x=2, the polymeric allophanate is based on a diol, and corresponds to the general structure:

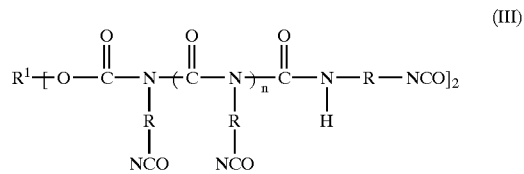

(III)

wherein: n, R, and $R^1$ are as defined in structure (I) above.

The polymeric allophanates based on diphenylmethane diisocyanate of the present invention have NCO group contents of from 12 to 30%, preferably from 18 to 29%, and most preferably 22 to 28%. These polymeric allophanates are storage stable liquids at room temperature, when they have an NCO group content of less than or equal to 29% by weight.

As used herein, the phrase "stable" means that the polymeric allophanate has up to a 1% absolute change in the NCO group content and up to a 10% change in the viscosity when stored at 25° C. for 3 months. As used herein, the term "liquid" means that the polymeric allophanate does not precipitate solids when stored at 25° C. for 3 months.

Suitable OH group-containing compounds to be used as (1) in the present invention include (a) aliphatic alcohols, (b) aromatic alcohols, (c) aliphatic diols and (d) mixtures thereof. U.S. Pat. No. 5,319,053, the disclosure of which is herein incorporated by reference, describes suitable compounds to be used as (1)(a) aliphatic alcohols in the present invention. U.S. Pat. No. 5,440,003, the disclosure of which is herein incorporated by reference, describes suitable compounds to be used as (1)(b) aromatic alcohols in the present invention.

More specifically, suitable aliphatic alcohols to be used as (1)(a) in the present invention include those aliphatic alcohols containing from 1 to 36, and preferably from 4 to 8 carbon atoms. Illustrative but nonlimiting examples of the aliphatic alcohols can be selected from the group consisting of cycloaliphatic alcohols, aliphatic alcohols containing groups that do not react with isocyanates, e.g. ether groups and halogens such as chloride and bromine. Other specific but non-limiting examples include compounds such as isobutyl alcohol, cetylalcohol, cyclohexanol, 2-methoxyethanol, and 2-bromoethanol.

In general, suitable aromatic alcohols for (1)(b) include those compounds which contain from 6 to 9 carbon atoms and have one hydroxyl group directly attached to the aromatic ring. Examples of suitable aromatic alcohols include phenol, the cresols, the xylenols and the trimethylphenols.

Aliphatic diols which are suitable compounds to be used as (1)(c) in the present invention include, for example, those aliphatic diols containing from 2 to 16 carbon atoms and having a molecular weight of 60 to 200. Examples of suitable aliphatic diols include compounds such as 1,2-propylene glycol, 1,3-propylene glycol, 1,3-butylene glycol, 1,4-butylene glycol, 1,6-hexanediol, 1,8-octanediol, 1,4-bis-hydroxymethycyclohexane, dipropylene glycol, tripropylene glycol, etc.

Diphenylmethane diisocyanate suitable for component (2) of the present invention comprises (a) from 0 to 60%, preferably from 1 to 40% and most preferably from 1.5 to 20% by weight of 2,4'-diphenylmethane diisocyanate, (b) less than 6%, preferably less than 3% and most preferably less than 1% by weight of 2,2'-diphenylmethane diisocyanate, and (c) the balance being 4,4'-diphenylmethane diisocyanate, with the %'s by weight of (2)(a), (2)(b) and (2)(c) totaling 100% by weight of (2).

Suitable allophanate catalysts for component (3) of the present invention include, for example, zinc acetylacetonate, zinc 2-ethylhexanoate, cobalt 2-ethylhexyloate, cobalt naphthenate, copper acetate monohydrate, and lead linoresinate. Zinc acetylacetonate is a preferred allophanate catalyst.

Catalyst stoppers (4) to be used in the present invention include, for example, acidic materials such as anhydrous hydrochloric acid, sulfuric acid, bis(2-ethylhexyl)hydrogen phosphate, benzoyl chloride, Lewis acids and the like. Generally, catalyst stoppers are added in an amount sufficient to provide a ratio of at least one (1) equivalent of the stopper (e.g. acid) to each mole of the allophanate catalyst, e.g. zinc acetylacetonate.

Prepolymers of the polymeric allophanates based on diphenylmethane diisocyanate are storage stable liquids. These prepolymers have NCO group contents of from 10 to 28%, preferably of from 14 to 25% and most preferably of from 17 to 24%.

As used herein, the phrase "stable" means that the prepolymer has up to a 1% absolute change in the NCO group content and up to a 10% change in the viscosity when stored at 25° C. for 3 months. As used herein, the term "liquid" means that the prepolymer does not precipitate solids when stored at 25° C. for 3 months.

Suitable OH-group containing compounds to be used as (C) in the prepolymers of polymeric allophanates include those OH-group containing compounds selected from the group consisting of: (1) one or more polyether polyols containing from about 1.5 to about 6 hydroxyl groups and having a molecular weight of about 300 to about 6,000, (2) one or more low molecular weight diols having a molecular weight of about 76 to about 200, (3) one or more poly-ester polyols containing from about 1.5 to about 3 hydroxyl groups and having a molecular weight of about 300 to about 3,000 and (4) mixtures thereof.

Some examples of suitable polyether polyols to be used as component (C)(1) include compounds containing from about 1.5 to about 6 hydroxyl groups, preferably from about 1.8 to about 3, and having a molecular weight of about 300 to about 6,000, preferably from about 400 to about 4,800. Suitable polyether polyols for component (C)(1) include compounds such as, for example, those started with ethylene glycol, propylene glycol, glycerin, trimethylolpropane, sorbitol, and sucrose and alkoxylated with a suitable alkylene oxide such as, for example ethylene oxide, propylene oxide styrene oxide, tetrahydofuran, etc. Preferred polyether polyols to be used in the present invention include all propylene oxide polyethers having equivalent weights of less than 1500, and polyethers having equivalent weights greater than 1500, and which contain at least 10% by weight of ethylene oxide, based on 100% by weight of alkylene oxide.

Diols which are suitable to be used component (C)(2) in the prepolymers of the present invention include those diols having a molecular weight of 76 to 200, preferably 90 to 192 and most preferably 90 to 150. Some examples of suitable diols include, for example, 1,3-butanediol, 1,2-propylene glycol, 1,3-propylene glycol, 2,2,4-trimethyl-1,3-pentanediol, 2-methyl-1,3-propanediol, dipropylene glycol, tripropylene glycol, diethylene glycol, triethylene glycol, etc. Preferred diols include 1,3-butanediol, 1,2-propylene glycol dipropylene glycol and tripropylene glycol.

Suitable compounds to be used as polyester polyols, component (C)(3), in the present invention include, for example, those polyester polyols containing from 1.5 to 3 hydroxyl groups and preferably from 1.8 to 2 hydroxyl groups, and having a molecular weight of about 300 to about 3,000, preferably of about 500 to about 2000. These polyester polyols include reaction products of polyhydric, preferably dihydric alcohols to which trihydric alcohols may be added and polybasic, preferably dibasic carboxylic acids.

Of course, it is possible to use a mixture of one or more of (C)(1) a polyether polyol as described above, (C)(2) a low molecular weight diol as described above, and/or (C)(3) a polyester polyol as described above, to form the stable liquid prepolymers of the polymeric allophanate based on diphenylmethane diisocyanate.

In the process for preparing the polymeric allophanate based on diphenylmethane diisocyanate, the diphenylmethane diisocyanate component (2) as described hereinabove, is reacted with (1) one or more OH-group containing compounds selected from the group consisting of (a) aliphatic alcohols, (b) aromatic alcohols, (c) aliphatic diols and (d) mixtures thereof, to form an urethane, which is subsequently converted to (A) the allophanate modified isocyanate based on MDI in the presence of (3) an allophanate catalyst at 80 to 100° C. The (A) allophanate modified isocyanate based on diphenylmethane diisocyanate is then held at a temperature at about 20 to about 70° C., preferably about 20 to 50° C. and most preferably about 30 to 40° C., for from about 1 hour to 30 days, preferably from about 1 day to about 30 days, thereby forming (B) the polymeric allophanate having an NCO group content of 12 to 30% by weight.

In an alternate embodiment, (1) one or more OH-group containing compounds (i.e., aliphatic alcohol, aromatic alcohol or aliphatic diol) and (2) the diphenylmethane diisocyanate can be reacted in one step in the presence of (3) the allophanate catalyst, to form (A) the allophanate modified isocyanate based on MDI directly, followed by conversion at 20 to 70° C. (preferably 20 to 50° C., most preferably 30 to 40° C.) to (B) the polymeric allophanate based on diphenylmethane diisocyanate which has an NCO group content of 12 to 30%.

In the formation of the polymeric allophanate of MDI by either embodiment described above, once the appropriate amount of conversion of (A) the allophanate modified isocyanate based on MDI to (B) the polymeric allophanate is achieved, as measured by a drop in the NCO group content below the theoretical allophanate NCO content, component (4) a catalyst stopper or other suitable acidic material such as, for example, benzoyl chloride, is typically added to the reaction mixture to stop or kill the allophanate catalyst. This is generally after the allophanate modified isocyanate based on MDI has been adequately cooled and held at a sufficiently low temperature to form the desired amount of polymeric allophanate based on MDI. The rate of formation of (B) the polymeric allophanate can be increased by use of a higher amount of (3) allophanate catalyst. This higher amount of catalyst can be added at the beginning of the allophanate reaction or after the allophanate reaction is complete. The allophanate catalyst (3) in (B) the resultant polymeric allophanate based on diphenylmethane diisocyanate is typically neutralized by the addition of (4) a catalyst stopper, before the preparation of prepoly-mers of the polymeric allophanates. As such, the allophanate catalysts useful herein are those that can be neutralized or otherwise stopped from adversely affecting subsequent reactions.

In the process of preparing the prepolymers of the polymeric allophanates, component (B) the polymeric allophanate based on diphenylmethane diisocyanate having an NCO group content of 12 to 30% which contains (4) a catalyst stopper, is reacted with (C) an OH-group containing compound which is selected from the group consisting of (1) polyether polyols, (2) low molecular weight diols, (3) polyester polyols and (4) mixtures thereof. These components are normally stirred together at 60 to 70° C. for 2 hours.

The polymeric allophanates and prepolymers of these polymeric allophanates, which are the subject of the present invention, are not stable at temperatures above 85° C. The term "stable" as used in this context is typically referred to as the thermal stability. This stability relates to the stability of the structure against degradation to another product, i.e. the standard allophanate of MDI. At 85° C. over time (usually days) these polymeric allophanates and the prepolymers thereof will revert back to the standard allophanate as is described in U.S. Pat. No. 5,319,053, the disclosure of which is herein incorporated by reference, and at 160° C., this reversion requires only about 10 minutes. However, these polymeric allophanates and prepolymers are stable at temperatures less than 70° C. and the resultant polyurethane polymers prepared from these are as stable as the polyurethane polymers made from the standard allophanates of MDI as described in U.S. Pat. No. 5,319,053. Thus, it is preferred to store these polymeric allophanates and prepolymers at temperatures less than 70° C., preferably between 20 to 60° C., and most preferably between 25 to 35° C.

As used herein, the term molecular weight refers to number average molecular weight as determined by end group analysis.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the preparation of the polymeric allophanates based on diphenylmethane diisocyanate.

| | |
|---|---|
| MDI-X: | diphenylmethane diisocyanate which contains less than 6% by weight of the 2,2'-isomer of diphenylmethane diisocyanate, and in which X represents the percent by weight of the 2,4'-isomer of MDI with the remainder being the 4,4'-isomer and 2,2'-isomers. |
| PG: | 1,2-propylene glycol |
| IBA: | isobutyl alcohol |
| Catalyst A | zinc acetylacetonate |

Example 1

100 parts (PBW) of MDI-2 and 5.45 parts of isobutyl alcohol (IBA) were charged to a stirred reactor and heated to 60° C. 0.0075 part of Catalyst A was added and the stirred reaction mixture was heated to 90° C. After 90 minutes at 90° C., the NCO content was 26.0% (theoretical allophanate) and the MDI monomer content was 63% by weight. The reaction mixture was cooled to 35° C. and held for 13 days followed by the addition of 0.015 part of benzoyl chloride. The resulting clear liquid polymeric allophanate had an NCO content of 21.2% and a viscosity at 25° C. of 8,800 mPa·s. The MDI monomer content was 44% by weight.

Example 2

100 parts of MDI-2 and 3.2 parts of IBA were charged to a stirred reactor and heated to 60° C. 0.0075 part of Catalyst A was added and the stirred reaction mixture was heated to 90° C. After 90 minutes at 90° C., the NCO content was 29.0% (theoretical allophanate) and the MDI monomer content was 77% by weight. The reaction mixture was cooled to 22° C. and held for 5 days followed by the addition of 0.015 part benzoyl chloride. The resulting clear liquid polymeric allophanate had an NCO content of 26.2% and a viscosity at 25° C. of 82 mPa·s. The MDI monomer content was 69% by weight.

Example 3

100 parts of MDI-2 and 4.0 parts of IBA were charged to a stirred reactor and heated to 60° C. 0.015 part of Catalyst A was added and the stirred reaction mixture was heated to 90° C. After 90 minutes at 90° C., the NCO content was 27.9% and the MDI monomer content was 73% by weight. The reaction mixture was cooled to 35° C. and held for 15 days followed by the addition of 0.03 part benzoyl chloride. The resulting clear liquid polymeric allophanate had an NCO content of 25.0% and a viscosity at 35° C. of 2800 mPa·s. The MDI monomer content was 48.3% by weight.

Example 4

Example 3 was repeated except the Catalyst A was doubled to 0.03 part. After 15 days at 35° C. a clear liquid polymeric allophanate resulted having an NCO content of 23.1% and a viscosity at 35° C. of 23,900 mPa·s. The MDI monomer content was 42.7% by weight.

Example 5

100 parts of MDI-2 and 1.8 parts of PG were charged to a stirred reactor and heated to 60° C. 0.015 part of Catalyst A was added and the stirred reaction mixture was heated to 90° C. After 90 minutes at 90° C., the NCO content was 29.1% and the monomer content was about 74.5% by weight. The reaction mixture was cooled to 35° C. and held for 15 days followed by the addition of 0.03 part benzoyl chloride. The resulting polymeric allophanate had an NCO content of 27.2% and a viscosity at 35° C. of 2,330 mPa·s. The MDI monomer content was 58.3% by weight.

Example 6

100 parts of MDI-52 and 3.2 parts of IBA were charged to a stirred reactor and heated to 60° C. 0.0075 part of Catalyst A was added and the stirred reaction mixture was heated to 90° C. After 90 minutes at 90° C., the NCO content was 29.0% and the MDI monomer content was about 77% by weight. The reaction mixture was cooled to 22° C. and held for 5 days followed by the addition of 0.015 part benzoyl chloride. The resulting clear liquid polymeric allophanate had an NCO content of 26.1% and a viscosity at 25° C. of 135 mPa·s. The MDI monomer content was 70.5% by weight.

The following materials were used in the preparation of the prepolymers of the polymeric allophanates based on diphenylmethane diisocyanate.

| | |
|---|---|
| ISO A: | the polymeric allophanate of Example 1, characterized by an NCO content of 21.3%, a viscosity at 25° C. of about of 8,800 mPa · s, and a MDI monomer content of 44% by weight. |
| Polyether Polyol A: | a propylene glycol/propylene oxide adduct having a molecular weight of about 1000 and a functionality of about 2 |
| Polyether Polyol B: | a propylene glycol/propylene oxide adduct having a molecular weight of 2000 and a functionality of about 2 |
| Polyether Polyol C: | a propylene glycol/propylene oxide/ethylene oxide adduct terminated with 50% by weight ethylene oxide having a molecular weight of 2000 and a functionality of about 2 |
| Polyether Polyol D: | a propylene glycol/propylene oxide/ethylene oxide adduct terminated with 30% by weight ethylene oxide having a molecular weight of 4000 and a functionality of about 2 |
| Polyether Polyol E: | a glycerin/propylene oxide adduct having a molecular weight of 1500 and a functionality of about 3 |
| Polyether Polyol F: | a glycerin/propylene oxide/ethylene oxide adduct terminated with 17% by weight ethylene oxide having a molecular weight of 3,000 and a functionality of about 3. |

Example 7

100 parts of iso A were charged to a reactor equipped with a stirrer. The contents of the reactor were heated with stirring to 60° C. 27 parts of Polyether Polyol A were then added and the reaction mixture was held at 60° C. for 2 hours and then cooled to 25° C. The clear liquid prepolymer had an NCO content of 14.8% and a viscosity at 25° C. of 63,100 mPa·s.

Example 8

Using the procedure as described above in Example 7, 100 parts of iso A and 33 parts of Polyether Polyol C were reacted to yield a clear liquid prepolymer having an NCO content of 14.9% and a viscosity at 25° C. of 19,700 mPa·s.

Example 9

Using the procedure as described above in Example 7, 100 parts of Iso A and 20 parts of Polyether Polyol B were reacted to yield a clear liquid prepolymer having an NCO content of 17.1% and a viscosity at 25° C. of 26,000 mPa·s.

Example 10

Using the procedure as described above in Example 7, 100 parts of Iso A and 20 parts of Polyether Polyol D were reacted to yield a clear liquid prepolymer having an NCO content of 17.2% and a viscosity at 25° C. of 22,000 mPa·s.

Example 11

Using the procedure as described above in Example 7, 100 parts of Iso A and 27 parts of Polyether Polyol E were reacted to yield a clear liquid prepolymer having an NCO content of 14.3% and a viscosity at 25° C. of 288,000 mPa·s.

Example 12

Using the procedure as described above in Example 7, 100 parts of Iso A and 20 parts of Polyether Polyol F were reacted to yield a clear liquid prepolymer having an NCO content of 17.1% and a viscosity at 25° C. of 31,600 mPa·s.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of a polymeric allophanate modified diphenylmethane diisocyanate having an NCO group content of 12 to 30% by weight, comprising:
   (I) reacting:
      (1) one or more OH-group containing compounds selected from the group consisting of: (a) aliphatic alcohols, (b) aromatic alcohols, (c) aliphatic diols and (d) mixtures thereof; and
      (2) diphenylmethane diisocyanate comprising:
         (a) from 0 to 60% by weight of 2,4'-diphenylmethane diisocyanate,
         (b) less than 6% by weight of 2,2'-diphenylmethafle diisocyanate, and
         (c) the balance being 4,4'-diphenylmethane diisocyanate, with the %'s by weight of (2)(a), (2)(b) and (2)(c) totaling 100% by weight of (2), in the presence of:
      (3) one or more allophanate catalysts, at temperatures of about 80 to about 110° C. to form (A) an allophanate-modified diphenylmethane diisocyanate; and
   (II) cooling (A) said allophanate-modified diphenylmethane diisocyanate to a temperature of about 20 to about 70° C. for about 1 hour to about 30 days, thereby forming (B) a polymeric allophanate modified diphenylmethafle diisocyanate.

2. The process of claim 1, wherein (1) said OH-group containing compound and (2) said diphenylmethane diisocyanate component are pre-reacted at temperatures of about 60 to about 90° C. to form a urethane, which is subsequently converted to the allophanate-modified diphenylmethane diisocyanate, in the presence of (3) said allophanate catalyst, at temperatures of about 80 to about 110° C.

3. The process of claim 1, wherein the resultant polymeric allophanate modified diphenylmethane diisocyanate has an NCO content of 18 to 29%.

4. The process of claim 1, wherein (1) said OH-group containing compound is selected from the group consisting of (a) aliphatic alcohols containing from 1 to 36 carbon atoms, (b) aromatic alcohols containing 6 to 9 carbon atoms and having one hydroxyl group directly attached to the aromatic ring, (c) aliphatic diols containing from 2 to 16 carbon atoms having a molecular weight of 60 to 200 and (d) mixtures thereof.

5. The process of claim 4, wherein (1)(a) said aliphatic alcohols contain from 4 to 8 carbon atoms.

6. The process of claim 4, wherein (1)(a) said aliphatic alcohols are selected from the group consisting of isobutyl alcohol, cetyl alcohol, cyclohexanol, 2-methoxyethanol and 2-bromoethanol.

7. The process of claim 4, wherein (1)(b) said aromatic alcohols are selected from the group consisting of phenols, cresols, xylenols and trimethylphenols.

8. The process of claim 4, wherein (1)(c) said aliphatic diols are selected from the group consisting of 1,2-propylene glycol, 1,3-propylene glycol, 1,3-butylene glycol, 1,4-butylene glycol, 1,6-hexanediol, 1,8-octanediol, 1,4-bis-hydroxymethylcyclohexane dipropylene glycol and tripropylene glycol.

9. The process of claim 1, wherein (2) said diphenylmethane diisocyanate comprises (a) from 1 to 40% by weight 2,4'-diphenylmethane diisocyanate; (b) less than 3% by weight of 2,2'-diphenylmethane diisocyanate; and (c) the balance being 4,4-diphenylmethane diisocyanate.

10. The process of claim 1, wherein (3) said allophanate catalyst is selected from the group consisting of zinc acetylacetonate, zinc 2-ethyl-hexanoate, cobalt 2-ethylhexyloate, cobalt naphthenate, copper acetate monohydrate and lead linoresinate.

11. The process of claim 1, further comprising:
(III) adding
(4) a catalyst stopper after (II) said cooling step.

12. A polymeric allophanate modified diphenylmethane diisocyanate having an NCO group content of 12 to 30% by weight, and comprising:
(A) an allophanate modified diphenylmethane diisocyanate, having an NCO group content of 20 to 32% and which comprises the reaction product of:
(1) one or more OH-group containing compounds selected from the group consisting of (a) aliphatic alcohols, (b) aromatic alcohols, (c) aliphatic diols, and (d) mixtures thereof; and
(2) diphenylmethane diisocyanate comprising:
(a) from 0 to 60% by weight of 2,4-diphenylmethane diisocyanate,
(b) less than 6% by weight of 2,2'-diphenylmethane diisocyanate, and
(c) the balance being 4,4'-diphenylmethane diisocyanate,
with the %'s by weight of (2)(a), (2)(b) and (2)(c) totaling 100% by weight of (2), in the presence of
(3) one or more allophanate catalysts;
wherein (A) said allophanate-modified diphenylmethane diisocyanate is held at a temperature of from about 20 to 70° C. from about 1 hour to about 30 days to form (B) the polymeric allophanate modified diphenylmethane diisocyanate.

13. The polymeric allophanate of claim 12, wherein the NCO group content is from 18 to 29%.

14. The polymeric allophanate of claim 12, wherein (A)(1) said OH-group containing compound is selected from the group consisting of: (a) aliphatic alcohols containing from 1 to 36 carbon atoms, (b) aromatic alcohols containing 6 to 9 carbon atoms and having one hydroxyl group directly attached to the aromatic ring, (c) aliphatic diols containing from 2 to 16 carbon atoms having a molecular weight of 60 to 200 and (d) mixtures thereof.

15. The polymeric allophanate of claim 14, wherein (A)(1)(a) said aliphatic alcohols contain from 4 to 8 carbon atoms.

16. The polymeric allophanate of claim 14, wherein (A)(1)(a) said aliphatic alcohols are selected from the group consisting of isobutyl alcohol, cetyl alcohol, cyclohexanol, 2-methoxyethanol and 2-bromoethanol.

17. The polymeric allophanate of claim 14, wherein (A)(1)(b) said aromatic alcohols are selected from the group consisting of phenols, cresols, xylenols and trimethylphenols.

18. The polymeric allophanate of claim 14, wherein (A)(1)(c) said aliphatic diols are selected from the group consisting of 1,2-propylene glycol, 1,3-propylene glycol, 1,3-butylene glycol, 1,4-butylene glycol, 1,6-hexanediol, 1,8-octanediol, 1,4-bis-hydroxymethylcyclohexane, dipropylene glycol and tripropylene glycol.

19. The polymeric allophanate of claim 12, wherein (A)(2) said diphenylmethane diisocyanate comprises (a) from 1 to 40% by weight 2,4'-diphenylmethane diisocyanate; (b) less than 3% by weight of 2,2'-diphenylmethane diisocyanate; and (c) the balance being 4,4-diphenylmethane diisocyanate.

20. The polymeric allophanate of claim 12, wherein (A)(3) said allophanate catalyst is selected from the group consisting of zinc acetylacetonate, zinc 2-ethylhexanoate, cobalt 2-ethylhexyloate, cobalt naphthenate, copper acetate monohydrate and lead linoresinate.

21. The polymeric allophanate of claim 12, wherein (A) said allophanate modified isocyanate is held at a temperature of from 20 to 70° C. from about 1 hour to about 30 days, followed by the addition of (4) one or more catalyst stoppers.

22. A polymeric allophanate modified diphenylmethane diisocyanate, having an NCO group content of 12 to 30% by weight and corresponding to the general structure:

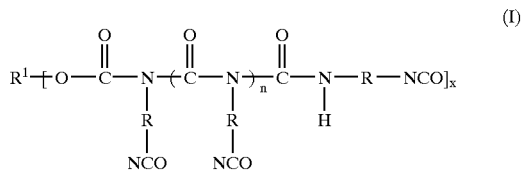

wherein:
n: represents an integer of from 1 to 100,
R: represents diphenylmethane; and
x: represents an integer of 1 or 2; with the proviso that:
when x=1,
R$^1$: represents a hydrocarbon radical containing from 1 to 36 carbon atoms, said hydrocarbon radical being selected from the group consisting of alkyl radicals, alkenyl radicals, cycloalkyl radicals, arylalkyl radicals and aryl radicals, each of which optionally contains groups that are not reactive with isocyanate groups; and
when x=2,
R1: represents a hydrocarbon radical containing from 2 to 16 carbon atoms, said hydrocarbon radical being selected from the group consisting of alkyl radicals, alkenyl radicals, cycloalkyl radicals and arylalkyl radicals, each of which optionally contains groups that are not reactive with isocyanate groups.

* * * * *